US012748857B2

(12) United States Patent
Mishra et al.

(10) Patent No.: US 12,748,857 B2
(45) Date of Patent: Sep. 29, 2026

(54) SCALABLE DETECTION OF HARDWARE TROJANS USING ATPG-BASED ACTIVATION OF RARE EVENTS

(71) Applicant: University of Florida Research Foundation, Inc., Gainesville, FL (US)

(72) Inventors: Prabhat Kumar Mishra, Gainesville, FL (US); Aruna Jayasena Ranhotige, Gainesville, FL (US)

(73) Assignee: University of Florida Research Foundation, INC., Gainesville, FL (US)

(*) Notice: Subject to any disclaimer, the term of this patent is extended or adjusted under 35 U.S.C. 154(b) by 59 days.

(21) Appl. No.: 18/794,774

(22) Filed: Aug. 5, 2024

(65) Prior Publication Data

US 2025/0086288 A1 Mar. 13, 2025

Related U.S. Application Data

(60) Provisional application No. 63/582,388, filed on Sep. 13, 2023.

(51) Int. Cl.
*G06F 21/57* (2013.01)
*G06F 21/71* (2013.01)

(52) U.S. Cl.
CPC ............ *G06F 21/577* (2013.01); *G06F 21/71* (2013.01); *G06F 2221/034* (2013.01)

(58) Field of Classification Search
CPC ... G06F 21/577; G06F 21/71; G06F 2221/034
See application file for complete search history.

(56) References Cited

U.S. PATENT DOCUMENTS

2003/0079189 A1* 4/2003 Abadir ........... G01R 31/318328 716/108
2005/0125755 A1* 6/2005 Lu .................. G01R 31/318328 716/113

OTHER PUBLICATIONS

Pan et al. "Automated test generation for hardware trojan detection using reinforcement learning." Proceedings of the 26th Asia and South Pacific Design Automation Conference (2021) (Year: 2021).*

(Continued)

*Primary Examiner* — Jung W Kim
*Assistant Examiner* — Alan L Kong
(74) *Attorney, Agent, or Firm* — Thomas | Horstemeyer, LLP

(57) ABSTRACT

The present disclosure presents systems and methods for test pattern generation to detect a hardware Trojan. One such method comprises simulating an integrated circuit design; during the simulation, identifying rare nodes within the integrated circuit design that are activated less than a pre-defined rareness threshold, wherein the rare nodes include both signals and branches of the integrated circuit design; mapping each rare node to a stuck-at fault model; obtaining a first set of N test vectors for each stuck-at fault model using Automated Test Pattern Generation, wherein each of the N test vectors activates a same rare node of the integrated circuit design; identifying maximal cliques of rare nodes in the integrated circuit design that can be activated at a same time; and/or generating a second set of test vectors to activate each of the identified maximal cliques using Automated Test pattern Generation.

18 Claims, 11 Drawing Sheets

(56) References Cited

OTHER PUBLICATIONS

Cruz et al. "Hardware Trojan detection using ATPG and model checking." 2018 31st international conference on VLSI design and 2018 17th international conference on embedded systems (2018) (Year: 2018).*
Lyu et al. "Scalable activation of rare triggers in hardware trojans by repeated maximal clique sampling." IEEE Transactions on Computer-Aided Design of Integrated Circuits and Systems 40.7 (2021) (Year: 2021).*
Cruz et al., "Hardware Trojan detection using ATPG and model checking." 2018 31st international conference on VLSI design and 2018 17th international conference on embedded systems (Year: 2018).*
Lyu et al., "Scalable activation of rare triggers in hardware trojans by repeated maximal clique sampling." IEEE Transactions on Computer-Aided Design of Integrated Circuits and Systems 40.7 (Year: 2021).*
Banga, Mainak, and Michael S. Hsiao. "A region based approach for the identification of hardware Trojans." 2008 IEEE International Workshop on Hardware-Oriented Security and Trust. IEEE, 2008.
Banga, Mainak, and Michael S. Hsiao. "Trusted RTL: Trojan detection methodology in pre-silicon designs." 2010 IEEE international symposium on hardware-oriented security and trust (HOST). IEEE, 2010.
Chakraborty, Rajat Subhra, et al. "MERO: A statistical approach for hardware Trojan detection." International Workshop on Cryptographic Hardware and Embedded Systems. Berlin, Heidelberg: Springer Berlin Heidelberg, 2009.
Cruz, Jonathan, et al. "An automated configurable Trojan insertion framework for dynamic trust benchmarks." 2018 Design, Automation & Test in Europe Conference & Exhibition (DATE). IEEE, 2018.
Cruz, Jonathan, et al. "Hardware Trojan detection using ATPG and model checking." 2018 31st international conference on VLSI design and 2018 17th international conference on embedded systems (VLSID). IEEE, 2018.
Elnaggar, Rana, Krishnendu Chakrabarty, and Mehdi B. Tahoori. "Hardware trojan detection using changepoint-based anomaly detection techniques." IEEE Transactions on Very Large Scale Integration (VLSI) Systems 27.12 (2019): 2706-2719.
Eppstein, David, Maarten Löffler, and Darren Strash. "Listing all maximal cliques in sparse graphs in near-optimal time." Algorithms and Computation: 21st International Symposium, ISAAC 2010, Jeju Island, Korea, Dec. 15-17, 2010, Proceedings, Part I 21. Springer Berlin Heidelberg, 2010.
Fujita, Masahiro, and Alan Mishchenko. "Efficient SAT-based ATPG techniques for all multiple stuck-at faults." 2014 International Test Conference. IEEE, 2014.
Haider, Syed Kamran, et al. "Advancing the state-of-the-art in hardware trojans detection." IEEE Transactions on Dependable and Secure Computing 16.1 (2017): 18-32.
Huang, Yuanwen, Swarup Bhunia, and Prabhat Mishra. "MERS: statistical test generation for side-channel analysis based Trojan detection." Proceedings of the 2016 ACM SIGSAC Conference on Computer and Communications Security. 2016.
Lyu, Yangdi, and Prabhat Mishra. "Scalable activation of rare triggers in hardware trojans by repeated maximal clique sampling." IEEE Transactions on Computer-Aided Design of Integrated Circuits and Systems 40.7 (2020): 1287-1300.
Mathaikutty, D. A., et al. "Model-driven test generation for system level validation. High Level Design Validation and Test Workshop, 2007. HLVDT 2007." (2007): 83-90.
Narasimhan, Seetharam, et al. "TeSR: A robust temporal self-referencing approach for hardware Trojan detection." 2011 IEEE International Symposium on Hardware-Oriented Security and Trust. IEEE, 2011.
Narasimhan, Seetharam, et al. "Hardware Trojan detection by multiple-parameter side-channel analysis." IEEE Transactions on computers 62.11 (2012): 2183-2195.
Nigh, Chris, and Alex Orailoglu. "AdaTrust: Combinational hardware trojan detection through adaptive test pattern construction." IEEE Transactions on Very Large Scale Integration (VLSI) Systems 29.3 (2021): 544-557.
Pan, Zhixin, and Prabhat Mishra. "Automated test generation for hardware trojan detection using reinforcement learning." Proceedings of the 26th Asia and South Pacific Design Automation Conference. 2021.
Pomeranz, Irith, and Sudhakar M. Reddy. "A measure of quality for n-detection test sets." IEEE transactions on computers 53.11 (2004): 1497-1503.
Shi, Zhendong, et al. "Test generation for hardware trojan detection using correlation analysis and genetic algorithm." ACM Transactions on Embedded Computing Systems (TECS) 20.4 (2021): 1-20.
Wolff, Francis, et al. "Towards Trojan-free trusted ICs: Problem analysis and detection scheme." Proceedings of the conference on Design, automation and test in Europe. 2008.
Zhang, Jie, et al. "VeriTrust: Verification for hardware trust." Proceedings of the 50th Annual Design Automation Conference. 2013.

* cited by examiner (b) AES 128 Core (a) ISCAS c2670

| Design | # of Gates | # of Rare Signals | Trojan Coverage (%) | | | | |
|---|---|---|---|---|---|---|---|
| | | | MERO [2] | TARMAC [3] | TGRL [9] | ND-ATPG | MC-ATPG |
| *c2670* | 1269 | 299 | 27.6 | 87.8 | 92.2 | 91.6 | 100 |
| *c5315* | 2307 | 443 | 49.3 | 80.1 | 95.2 | 94.7 | 100 |
| *c6288* | 2416 | 479 | 57.2 | 76.7 | 100 | 100 | 100 |
| *c7552* | 3513 | 517 | 39.1 | 47.1 | 99.1 | 100 | 100 |
| *s13207* | 2573 | 792 | 8.2 | 71.3 | 92.3 | 93.1 | 100 |
| *s15850* | 3448 | 897 | 11.7 | 66.5 | 87.5 | 90.2 | 100 |
| *s35932* | 12204 | 1027 | 15.2 | 80.4 | 89.8 | 89.7 | 100 |
| *Average* | 3962 | 636.3 | 29.8 | 72.8 | 93.7 | 94.2 | 100.0 |

TABLE III

FIG. 10B

| Design | Module | No. of Signals | TARMAC | | | | MC-ATPG | | | |
|---|---|---|---|---|---|---|---|---|---|---|
| | | | Time (Mins) | | | Cov % | Time (Mins) | | | Cov % |
| | | | Graph Generation | Clique Partitioning | Clique Activation | | Graph Generation | Clique Partitioning | Clique Activation | |
| *AES* | *Sbox* | 2056 | 172.76 | 22.83 | 491.45 | 82.1 | 39.53 | 0.05 | 22.37 | 100 |
| | *SboxX* | 2056 | 193.01 | 16.98 | 647.01 | 79.2 | 42.43 | 0.05 | 29.43 | 100 |
| | *AES (Top)* | 90956 | Instrumentation Failed | | | | 3768.09 | 0.09 | 446.88 | 91.2 |
| *ECDSA* | *eeageneric* | 1936 | 183.55 | 17.96 | 531.29 | 85.4 | 30.22 | 0.05 | 17.73 | 99.7 |
| | *montgomeryLadder* | 20356 | Instrumentation Failed | | | | 1897.38 | 0.09 | 884.62 | 87.8 |
| | *ECDSA (Top)* | 107925 | Instrumentation Failed | | | | 2984.89 | 0.11 | 2002.11 | 82.3 |
| *RISCY* | *Execute* | 3723 | 36.34 | 5.63 | 44.3 | 88.5 | 16.71 | 0.01 | 14.32 | 100 |
| | *Decode* | 13833 | 205.32 | 24.64 | 638.86 | 67.9 | 115.32 | 0.23 | 78.65 | 74.54 |
| | *Core (Top)* | 352968 | Instrumentation Failed | | | | 4786.98 | 0.56 | 2967.89 | 59.09 |
| *RISCV-UE* | *Issue* | 5642 | 132.98 | 16.1 | 397.3 | 89.73 | 43.73 | 0.01 | 43.76 | 95.89 |
| | *CSR* | 10977 | 196.5 | 16.8 | 484.53 | 73.43 | 79.03 | 0.06 | 74.08 | 79.04 |
| | *Core (Top)* | 497843 | Instrumentation Failed | | | | 4912.89 | 0.76 | 4143 | 54.78 |

TABLE IV

FIG.10C (a) Time taken for cycle unrolled AES (b) Trojan coverage observed for cycle unrolled AES (a) RISC-V Core sizes with respect to the number of signals in the flattened design.

| RISCY Core | DarkRV | picoRV-1 | picoRV-2 | picoRV-3 | Electrone | EH1 | RISCY | RV-UE |
|---|---|---|---|---|---|---|---|---|
| No. Signals | 3806 | 6437 | 8632 | 15864 | 104232 | 194637 | 352968 | 497843 |

(b) Time taken for different RISC-V cores (c) Trojan coverage observed for different RISC-V cores

SCALABLE DETECTION OF HARDWARE TROJANS USING ATPG-BASED ACTIVATION OF RARE EVENTS

CROSS-REFERENCE TO RELATED APPLICATION

This application claims priority to U.S. provisional application entitled, "Scalable Detection of Hardware Trojans Using ATPG-Based Activation of Rare Events," having application No. 63/582,388, filed Sep. 13, 2023, which is entirely incorporated herein by reference.

STATEMENT REGARDING FEDERALLY SPONSORED RESEARCH OR DEVELOPMENT

This invention was made with government support under 1908131 awarded by The National Science Foundation. The government has certain rights in the invention.

BACKGROUND

Semiconductor supply chain vulnerability is a major concern in designing trustworthy systems. Malicious implants, popularly known as hardware Trojans, can get introduced at different stages in the System-on-Chip (SoC) design cycle. While there are promising test generation techniques for hardware Trojan detection, they have two practical limitations: (i) these approaches are designed to activate rare states while ignoring rare transitions, and (ii) these approaches are not scalable for large designs.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 10B shows a table (Table III) with results for combinational and sequential ISCAS benchmarks.

FIG. 10C shows a table (Table IV) with coverage results for the benchmarks of AES, ECDSA, and two RISC-V processor cores.

DETAILED DESCRIPTION

The present disclosure presents a scalable test generation framework for detecting hardware Trojans using Automated Test Pattern Generation (ATPG) based activation of rare events having two test generation methods: N-activation of rare events using ATPG (ND-ATPG) and ATPG-based activation of maximal cliques (MC-ATPG).

For the present disclosure, it is generally assumed that an adversary may exploit rare events consisting of rare signals (states) as well as rare branches (transitions). The present disclosure shows that the rare branch coverage problem can be mapped to the rare signal coverage problem. In accordance with various embodiments of the present disclosure, the complementary abilities of N-detection and maximal clique activation of rare events are utilized to generate efficient test patterns. Experimental evaluation shows that an exemplary ATPG-based framework of the present disclosure is scalable and significantly outperforms the state-of-the-art test generation based Trojan detection techniques.

Semiconductor companies rely on the global supply chain for the development of System-on-Chip (SoC) designs. This involves increasing utilization of third-party Intellectual Property (IP) cores as well as outsourcing of various design automation activities including validation, synthesis, layout, and fabrication. An attacker has various opportunities to introduce Hardware Trojans (HT) by exploiting supply chain vulnerabilities.

Figure 1:
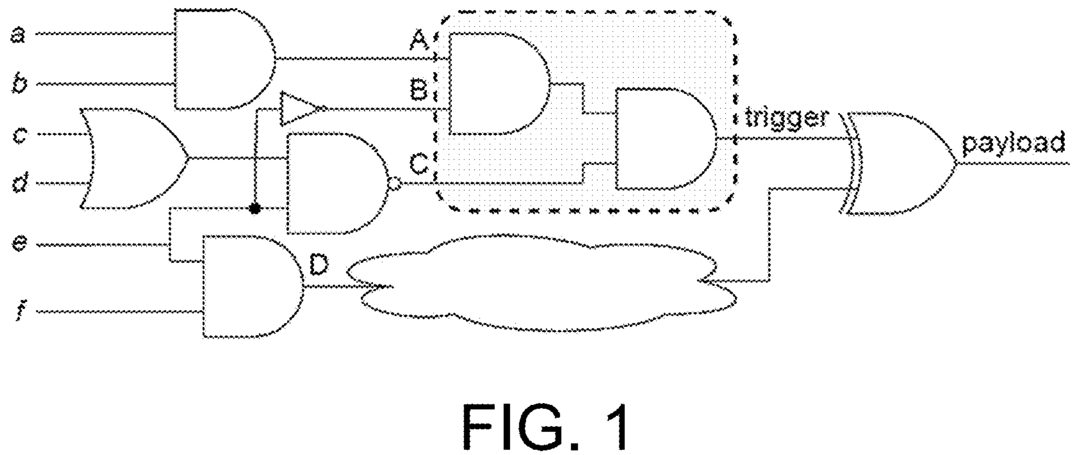
FIG. 1 shows an example Trojan circuit with a trigger and payload, where the Trojan circuit is triggered by three rare signals (A,B,C)

A threat model of the present disclosure assumes that an adversary can introduce hardware Trojans (HT) during any stages of the SoC development cycle including the design of RTL (Register Transfer Language) models, synthesis to gate-level netlist, and fabrication. An HT consists of two major components: trigger and payload. An adversary is likely to construct the trigger such that it will avoid detection during traditional validation using millions of random or constrained-random test patterns. A stealthy trigger can be constructed using rare events such as rare signals (states) or rare branches (transitions). FIG. 1 shows an example Trojan circuit with a trigger and payload. When the trigger gets activated, the payload can enable malicious activities such as information leakage, incorrect execution, or denial-of-service. In the example circuit, the Trojan payload flips the expected output.

Figure 2:
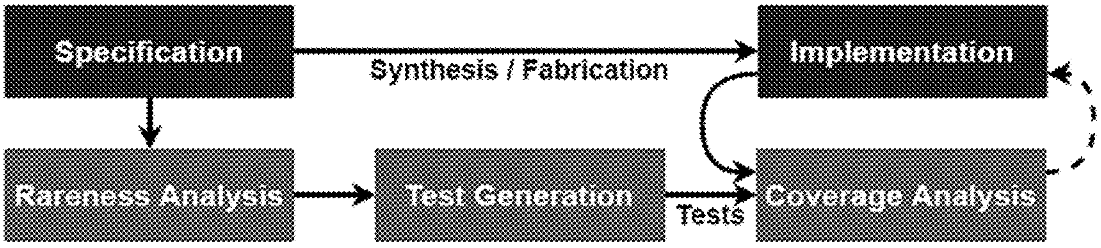
FIG. 2 presents an overview of test generation based Trojan detection.

There are a wide variety of HT detection methods. Many recent approaches rely on generating test patterns using golden models (e.g., TLM or RTL models) and applying them on gate-level implementation (assumes HT introduction during synthesis) or integrated circuits (assumes HT introduction during fabrication). FIG. 2 shows a broad overview of these methods that include a rareness analysis stage, a test generation stage, and a coverage analysis stage. The recent test generation methods can be mainly divided into two categories: (i) statistical test generation that relies on N-detect principle which tries to activate each rare signal N times, and (ii) maximal clique sampling that tries to activate as many rare signals as possible using a single test.

Figure 3:
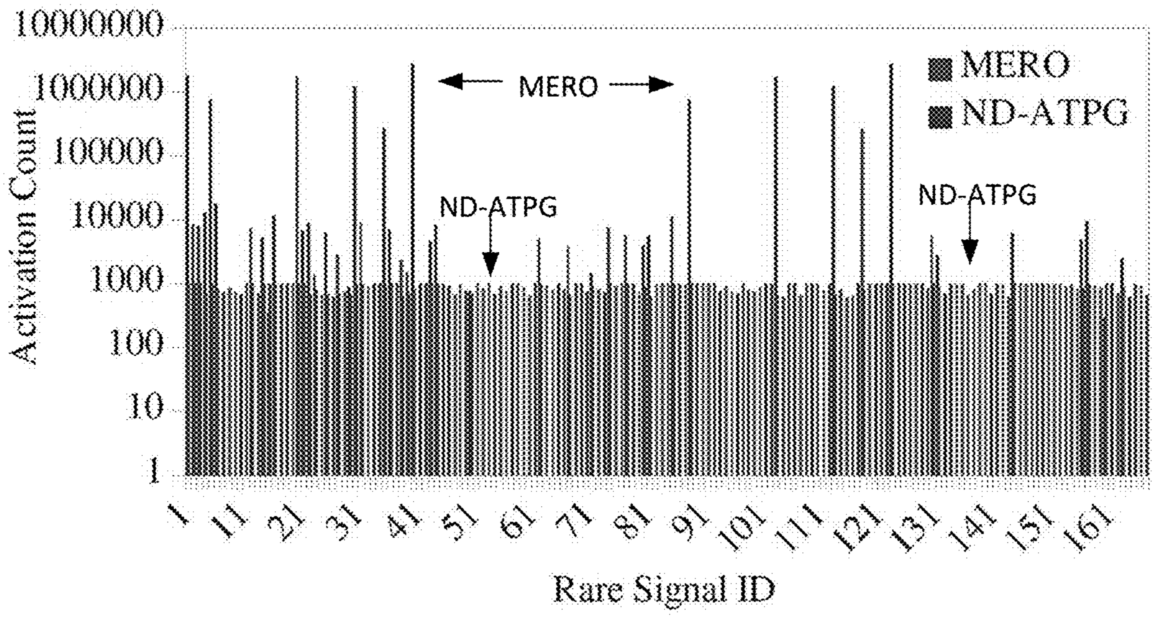
FIG. 3 shows the rare node activation count of a statistical test generation approach (MERO) compared with an exemplary statistical test generation approach (ND-ATPG) of the present disclosure for N=1000 on an elliptic curve cryptography module.
Figure 4:
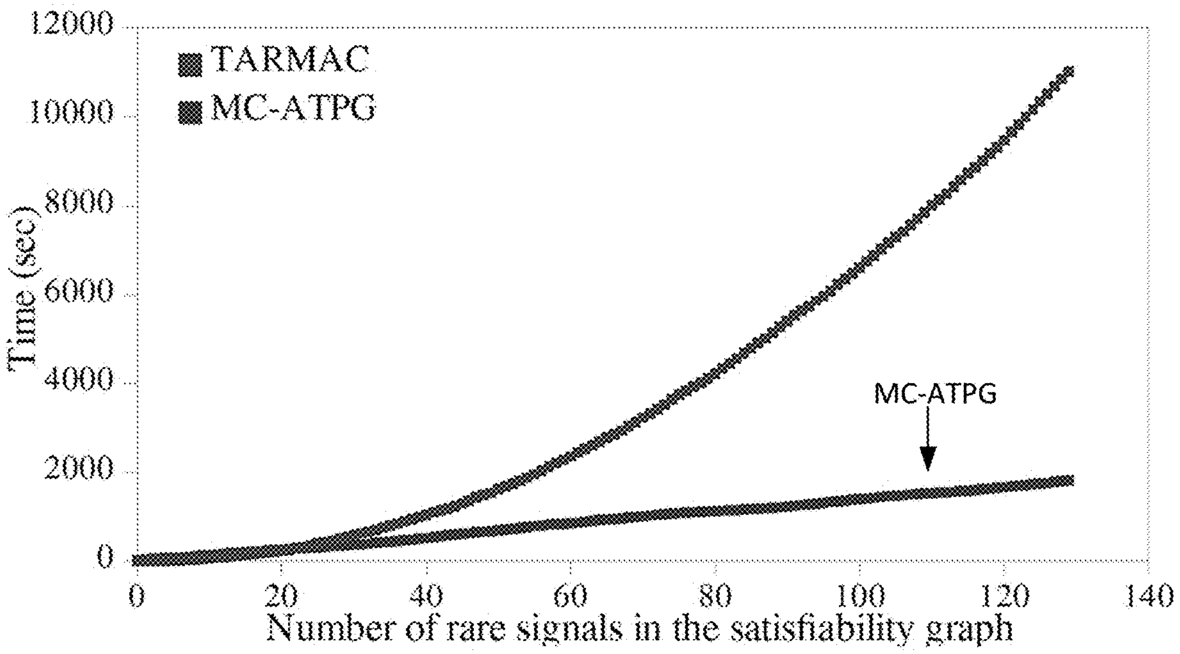
FIG. 4 shows a SATisfiability graph generation time of a maximal clique activation technique (TARMAC (with lazy construction)) compared with an exemplary maximal clique activation technique (MC-ATPG) of the present disclosure for an eeageneric module in elliptic curve cryptography.

While the existing approaches are promising in increasing the likelihood of activating the unknown and stealthy trigger, they have two major limitations: scope and scalability. These approaches have a limited scope since they focus on rare signals (states), but an attacker may exploit both rare signals (states) as well as rare branches (transitions). Moreover, these approaches are not scalable for large designs since the underlying bit-flipping (statistical) or constraint solving (computing expression for cliques) algorithms are exponential with respect to the design (and input) complexity. In fact, a statistical algorithm is likely to violate the N-detect (ND) principle. As shown in FIG. 3, some rare nodes are activated too many times while the rarest ones are not activated at all by the MERO statistical test generation approach, see Chakraborty et al., "MERO: A Statistical Approach for Hardware Trojan Detection," in Cryptographic Hardware and Embedded Systems (CHES) (2009), pp. 396-410, while an exemplary ATPG-based approach (ND-ATPG) of the present disclosure activates each rare node N times. On the other hand, the time complexity of the state-of-the-art maximal clique activation technique (TARMAC, see Lyu et al., "Scalable Activation of Rare Triggers in Hardware Trojans by Repeated Maximal Clique Sampling," IEEE Transactions on Computer-Aided Design of Integrated Circuits and Systems, vol. 40, no. 7 (2021), pp. 1287-1300) grows significantly with the increase in the number of rare nodes. FIG. 4 shows the satisfiability graph generation time of TARMAC compared with an exemplary ATPG-based maximal clique activation (MC-ATPG) of the present disclosure. It can be observed that MC-ATPG significantly outperforms TARMAC in terms of scalability.

In describing embodiments of Automated Test Pattern Generation (ATPG) for N-activation as well as maximal clique activation of rare events, the present disclosure contemplates (i) how to utilize ATPG to activate rare branches, (ii) what is the rationale for N-activation of rare signals and branches, (iii) how to use ATPG for activating a rare event (rare signal or rare branch) multiple times since ATPG provides only one test for a given fault, (iv) how to construct a satisfiability graph with ATPG, and (v) how to activate cliques of rare events with ATPG. For the first challenge, the branch coverage problem is mapped to a stuck-at coverage problem. The second challenge is addressed by realizing that the output of the trigger may be the rarest signal (or branch), but it may have been introduced during fabrication. In other words, if the trigger was in the RTL design, activating each rare signal (or branch) only once would have activated the trigger, and the designer should have removed it during the design phase. The third challenge is addressed by automatically generating constraints based on the previously generated test so that it can provide a new test in the next iteration for the same stuck-at fault. The fourth and fifth challenges are addressed by implementing stuck-at faults combined with output port constraints by connecting all rare events to the outputs of the design (only for test generation purposes).

As such, the present disclosure shows that the rare branch coverage problem can be mapped to the rare signal coverage problem. To the best of the inventors' knowledge, there are no prior test generation efforts for N-activation of rare branches. Accordingly, various embodiments of the present disclosure provide a scalable framework for N-activation of rare events (i.e., rare signals and rare branches) using ATPG and a complementary and scalable framework for activating maximal cliques of rare events using ATPG. Experimental results show that an exemplary ATPG-based framework is scalable and significantly outperforms the state-of-the-art test generation based HT detection techniques.

Generally, random and constrained random tests are widely used during traditional functional validation methodology. Due to the exponential input space complexity of the designs, even billions or trillions of test vectors are not enough to validate all possible functional scenarios in today's industrial designs. Directed tests are promising to cover the remaining scenarios as well as the corner cases that are not activated by random and constrained-random tests. Manual development of directed tests is time-consuming, error-prone, and can be infeasible for complex designs. There are effective approaches for automated generation of directed tests that can be utilized for activating targeted scenarios. While these approaches are useful for validation of functional scenarios, they are not suitable for detecting security vulnerabilities such as hardware Trojans. This is due to the fact that stealthy Trojans consists of extremely rare trigger conditions.

There are a wide variety of approaches for the detection of hardware Trojans (HT) that can be divided into three broad categories: test generation (simulation-based validation), side-channel analysis, and machine learning (ML). ML-based approaches can be further subdivided based on whether they require golden model (supervised learning) or not (unsupervised learning). The present disclosure is concerned with test generation based HT detection. This assumes that the activation of HT will lead to a functional mismatch. In other words, if the generated test can activate the HT trigger during simulation (execution), the HT can be detected by comparing the output with the expected output. There are two complementary avenues for test generation based HT detection: statistical test generation and maximal clique sampling.

Statistical test generation approaches rely on the N-detect principle that tries to activate each rare node N times. Assuming an adversary is likely to construct a trigger consisting of rare nodes, the goal of the statistical approaches is to maximize the likelihood of activating the unknown trigger. Unfortunately, the statistical approach is not scalable for large designs due to the exponential nature of its bit-flipping based algorithm (MERO) as demonstrated in FIG. 11. Most importantly, it typically violates the N-detect policy since it cannot activate all the rare nodes in a reasonable time. For example, FIG. 3 shows that MERO can never activate some of the rare nodes even for simple designs. While Pan et al. improved the limitations of the bit-flipping algorithm using reinforcement learning (TGRL), it still faces the scalability problem. See Pan et al, "Automated Test Generation for Hardware Trojan Detection Using Reinforcement Learning," in 2021 26th Asia and South Pacific Design Automation Conference (ASP-DAC) (2021), pp. 408-413. There are various research efforts that utilizes MERO as the initial test pattern generator for side-channel based test generation. The N-detect concept has been used for the isolation of a suspected signal for equivalence checking. Physically aware test selection using N-detect principle is utilized to improve the defect coverage in manufacturing testing. None of these approaches are used for activating triggers with rare signals as well as rare branches in complex pre-silicon designs.

Maximal clique sampling (TARMAC) attacks the problem from the opposite direction. Unlike statistical approaches that try to activate each node N times, TARMAC tries to activate as many rare nodes as possible using a single test by covering the maximal cliques in a graph consisting of rare nodes. Specifically, it constructs the logical expressions of each rare node and checks the satisfiability of multiple expressions corresponding to a clique in the graph. This approach is not scalable since the complexity of the expression generation as well as satisfiability solving grow exponentially with the design size. For example, FIG. 4 shows the exponential nature of graph generation time with TARMAC. There are promising efforts in utilizing ATPG for HT detection that has explored a hybrid solution consisting of ATPG and model checking for HT detection in full-scan as well as partial-scan designs. To the best of the inventors' knowledge, the present disclosure presents the first attempt at utilizing ATPG for activation of rare events (signals and branches) for efficient and scalable detection of hardware Trojans.

Figure 5:
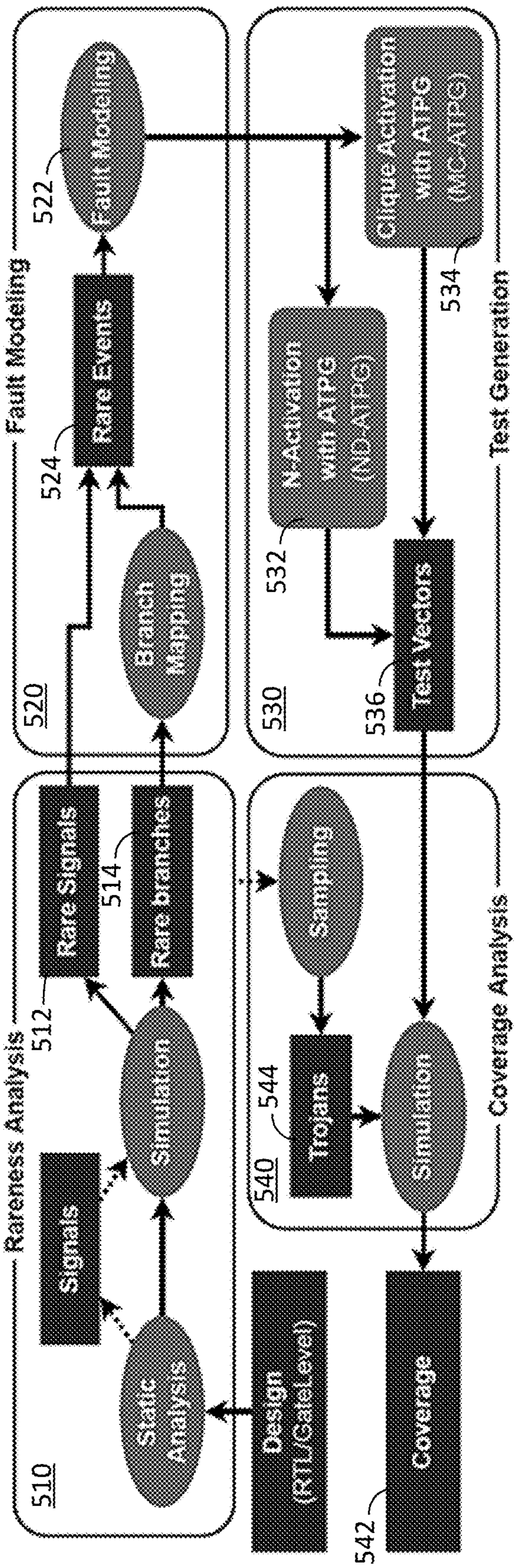
FIG. 5 shows an overview of Automated Test Pattern Generation (ATPG)-based activation of rare events for hardware Trojan detection, in accordance with various embodiments of the present disclosure.

FIG. 5 provides a high-level overview of an exemplary methodology of the present disclosure and Algorithm 1 (below) highlights major steps in the methodology: rareness analysis 510, fault modeling 520, test generation 530 for activation of rare events, and coverage analysis 540. First, in accordance with various embodiments of the present disclosure, an exemplary system or method performs rareness analysis 510 by simulating with millions of random tests. Specifically, the system/method marks the signals and branches that are activated less than a specific threshold. Next, the system/method maps the rare branch coverage problem to rare signal coverage problem to generate rare events 512, 514. These rare events are converted to stuck-at faults to enable ATPG-based test generation as part of fault modeling 522. Specifically, the system/method performs two complementary ATPG-based test generation approaches: (i) ATPG-based N-activation of rare events (ND-ATPG) 532, and (ii) ATPG-based maximal clique activation (MC-ATPG) 534 to generate test vectors 536. Finally, the system/method evaluates the quality of the generated tests by computing the coverage 542 of the detected Trojans using Trojan-embedded benchmarks 544.

Algorithm 1 Activation of Rare Events with ATPG

Input design D, rarenessThreshold r, N
Output testVectors T
1: $\{R_s, R_b \leftarrow$ rarenessAnalysis(D,r)
2: $\{D', R_{b2s}) \leftarrow$ mapBranch2Signal(D, $R_b$)
3: $S_f \leftarrow$ faultModeling($R_s$, $R_{b2s}$)
4: Tests $\leftarrow$ testGeneration(D', $S_f$, N)
5: coverageAnalysis(D, Tests)
6: Return Tests As discussed, attackers are likely to use extremely rare (hard-to-detect) behaviors to trigger the attack. If an attacker constructs a trigger using non-rare (easy-to-activate) behaviors, the trigger is likely to be activated during traditional functional validation, and therefore, the Trojan will be easily detected. With rareness analysis 510, the corner cases are highlighted that are not validated by functional validation. In accordance with various embodiments of the present disclosure, an integrated circuit design (RTL or the gate-level models) is simulated for an adequate number of random simulations. In general, the hierarchical designs are flattened before the simulation to ensure that each signal has a unique identity. For synchronous designs, the number of clock cycles to simulate the design is determined by the design pipeline depth. For example, in case of AES benchmark, the pipeline depth is 21 clock cycles. Therefore, it is important to do each simulation at least 21 cycles for the rareness analysis 510 to get a set of useful rare events in case of AES benchmark.

During simulation, every signal of the circuit design is monitored for its values. For multi-bit variables in RTL designs, each bit is monitored individually. Next, the rareness value is calculated for each variable for the occurrence of '1' and '0' and a rareness threshold is used to filter the rarest signals from all the signals. Consider the simplified code snippet shown in Listing 1 (below) as an illustrative example.

Listing 1: Illustrative example for rare events

```
1  module simpleAes (clk, rst, key);
2    input              clk, rst;
3    input              [7:0] key;
4    output reg         [7:0] state_out;
5    reg [1:0]          a, b, c, d;
6    wire N13;
7    always @ (posedge clk) begin
8      if (key=8'd255)
9        a <= a + 1'b1;
10   end
11   assign N13 = (a[1])? 1'b0 : 1'b1;
12 endmodule
```

Let's assume '0.2' as the rareness threshold. Here, assignment to the register 'a' is under a rare branch. The probability of 'key' having the value of 255 as shown in line 8 is 0.004 which makes it a rare event. Assignment to the wire 'N13' happens based on the output of the rare branch which makes 'N13' having the value '0' even rarer. During the simulation, the value of 'N13' is monitored to calculate its rareness for different values. For example, the rareness of {N13, 0} can be calculated by dividing the number of instances 'N13' appeared as '0' by the total number of appearances of 'N13'. According to the example, in Listing 1, occurrence of N13 appearing as '0' is below the rareness threshold which makes the signal {N13, 0} a rare signal 512.

Elimination of false positive rare signals can be achieved by removing signals that may appear as rare during simulation but they are not rare (e.g., they have fixed values). Consider AES benchmark that contains a multi-bit signal named as rcon which is assigned to a fix constant hex value. During simulation, similar signals do not change their pre-assigned constant values unless they are updated later by a different assignment. Since they are non-rare signals, an attacker is unlikely to use them to construct a trigger.

Therefore, eliminating such signals will lead to improved rareness analysis. Note that we cannot simply remove signals with rareness value of 0 since rareness of 0 can also be caused by insufficient number of simulation iterations. In order to eliminate such false positive signals, a static data-flow analysis is performed. First, the Data Flow Graph (DFG) of the design is constructed. Next, all static signals are eliminated. Finally, we recursively go through the DFG to identify and remove signals from the set of potential rare nodes where the predecessor signal is a constant.

For designs with branches (e.g., RTL models), during each random simulation, the status of each branch is monitored whether it was taken or not. The branches that were activated less than the rareness threshold during the random simulation are considered as rare branches 514. In the example of Listing 1, the probability of the branch in line 8 activating under random simulation is low and hence it will be considered as a rare branch (rare event).

Once rare branches are identified, the system/method assigns a unique tag (identifier signal) for each rare branch 514. Algorithm 2 (below) presents an exemplary methodology of implementing the tag signal-if the branch is taken, the tag value is set to '1', otherwise the tag value is set to '0'. A rare branch with tagging is shown in Listing 2. Here 't0' is the tag signal and it is assigned to value '1' under the rare branch in line 9.

Algorithm 2 mapBranch2Signal

```
Input design D, branch R_b
Output tag R_b2s, design D'
    R_b2s ← ∅
    for Each b_i ∈ R_b do
        D' ← D.append(t_i)              ▷ add signal t_i to the design
        R_b2s.append(t_i)
        for lines in D do
            if reset block in line then    ▷ Locate reset block
                D'.append(t_i + 1'b0)       ▷ Initialize t_i to 0
            end if
            if b_i in line then            ▷ locate the branch b_i
                D'.append(t_i ← 1'b1)       ▷ Set t_i to 1
            end if
        end for
    end for
    Return D', R_b2s
```

Stuck-at Fault modeling 522 is performed for the rare events 524 consisting of rare signals 512 as well as rare branches 514 identified during rareness analysis 510. For all the rare events 524, corresponding nets are connected to the design output so that the net names are preserved after the synthesis. Instrumented design for the illustrative example is provided in Listing 3 (below). The design is synthesized to a gate-level netlist to prepare it for ATPG-based test generation. Stuck-at faults are generated for each of the rare events. Table I shows two example rare nodes (N13 from Listing 1 and t0 from Listing 2) converted to a stuck-at-fault model.

Listing 2: Branch tagging example

```
1  module simpleAes (clk, rst, key);
2    ...
3    reg t0;
4    always @ (posedge clk) begin
5      if (rst)
6        t0 <=1'b0;
7      if (key=8'd255)
8        a <= a + 1'b1;
9        t0 <= 1'b1;
10   end
11   ...
12 endmodule
```

Listing 3: Instrumented design before synthesis for the illustrative example provided in Listing 1

```
module simpleAes (clk, rst , key, t0, N13, a_1);
  input            clk, rst;
  input            [7:0] key;
  output reg       [7:0] state_out;

  output t0, N13, a_1;
  assign a_1 = a[i];
  reg t0;
  reg [1:0]        a, b, c, d;
  wire N13;
  always @ (posedge clk) begin
    if (rst)
      t0 <= 1'b0;
    if (key=8'd255)
      a <= a + 1'b1;
      t0 <= 1'b1;
  end
  assign N13 = (a[1])? 1'b0 : 1'b1;
endmodule
```

TABLE I

| Rare Node | | |
|---|---|---|
| Net | Value | Stuck-at-fault |
| t0 | 1 | add_faults -stuck 0 t0 |
| N13 | 0 | add_faults -stuck 1 N13 |

Figure 6:
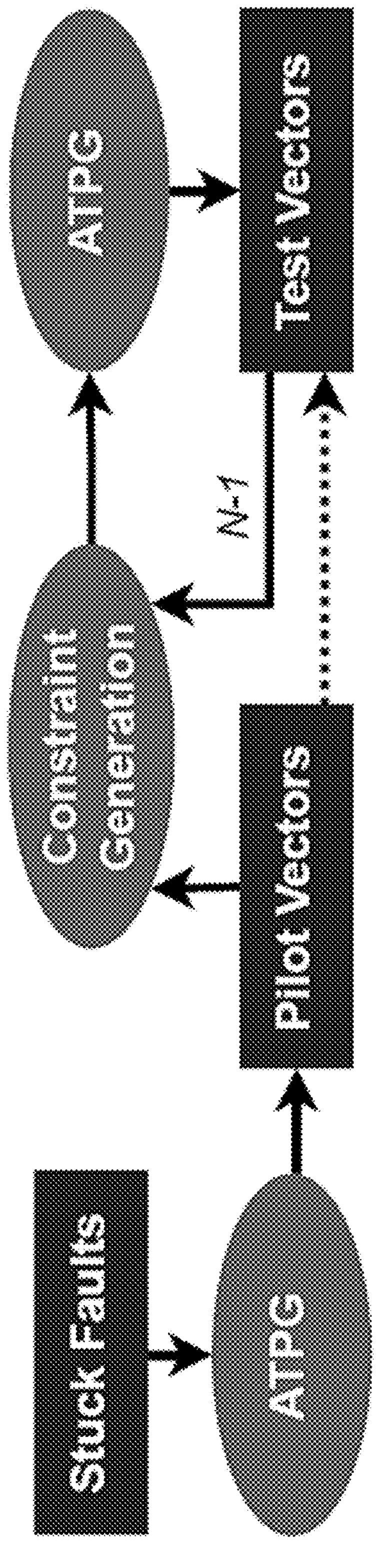
FIG. 6 shows an overview of N-activation of rare events using ATPG in accordance with FIG. 5.

As shown in FIG. 6, once all the rare events are converted to the stuck-at fault model, N test vectors are obtained for each stuck-at fault to satisfy the N-detect principle such that each rare event is activated at least N times (each test activates them once). Although a typical ATPG tool produces one test vector for one fault, an exemplary ATPG tool of the present disclosure is able to obtain N test vectors for each fault using ATPG.

In accordance with various embodiments test generation for N-activation is carried out in two steps, as depicted in FIG. 6. The first step generates the initial test vectors (one test for each fault) which are referred as pilot vectors. The second step generates the remaining N−1 vectors (for each fault) based on the pilot vectors with constraints.

Algorithm 3 (below) outlines steps involved in the generation of test vectors. For each stuck-at-fault, ATPG is invoked to generate the pilot vector corresponding to the specific fault (lines 2-4). In order to generate the remaining N−1 vectors per fault, constraints are generated from the previous test to generate the next test (lines 8-13). Algorithm 4 (below) outlines the major steps for generating the constraints. With constraint generation, we can limit the input pattern for certain input ports of the design by referring to the previously generated test. N−1 constraints are generated such that every constraint will generate a new test vector to activate the same stuck-at-fault. Therefore, N-activation of the same rare event can be achieved with different test vectors. For the illustrative example (Listing 1), assume that the sample pilot vector for the stuck-at-fault '{-stuck 0 t0}" is '11111111'. This vector is corresponding to the input port 'key [7:0]'. In order to generate the remaining (second-generation) test vectors, one possible constraint is to flip the key [7] (MSB) and provide it as a constraint to the ATPG tool. The sample constraint for the above example would be "add pi constraints 0 key [7]". Algorithm 4 (below) will always provide a new constraint until N−1 tests are generated (in addition to the pilot vector).

Algorithm 3 testGeneration with ND-ATPG

```
Input design D, faultList Sf, N
Output testVectors T
    T ← ∅
    for Each f ∈ Sf do
      T[f] ← ATPG(D_(G), f)          ▷ Generate pilot vectors
    end for
    for Each f ∈ Sf do
      t_f ← T[f]
      C_f ← ∅
      for i = 0 → N − 1 do
        c_i ← getConstraints(t_f, D.p_i, C_f)
        t_f ← ATPG(D, c_i, f)
        C_f.append(c_i)
        T[f][i] + t_f                ▷ Second generation test vectors
      end for
    end for
    Return T
```

Algorithm 4 getConstraints

```
Input testVector t_x, inputPorts p_i, constraintList C_f
Output constraint c_x
    for t in t_x do
      c_x ← {p_i^t = t^-1}           ▷ Generate a new c_x for f
      if c_x ∈ C_f then
        c_x ← getConstraints(t_f,p_i,C_f)
      else
        Return c_x
      end if
    end for
```

Figure 7:
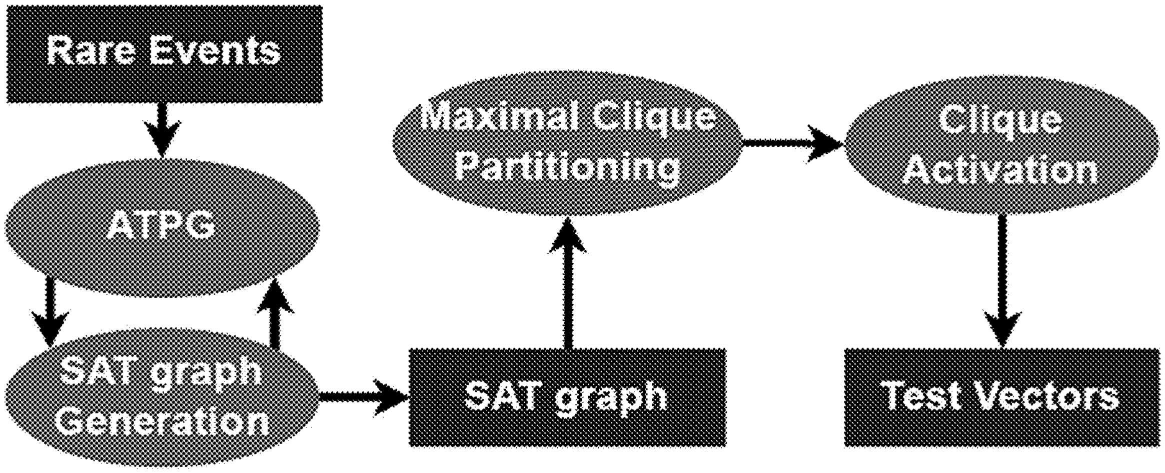
FIG. 7 shows an overview of maximal clique activation of rare events in accordance with FIG. 5.

The previous discussion considered N-activation methodology where each rare event is activated N times hoping that N test vectors will trigger different Trojans that consist of a specific combination of rare events chosen by the attacker. Now, a complementary approach is considered, where all the trigger combinations at once are attempted to be activated at once, which can produce more effective and compact test vectors with the cost of time and effort. Accordingly, FIG. 7 provides an overview of an exemplary test generation framework using ATPG-based maximal clique activation and Algorithm 5 (below) outlines the following major steps in FIG. 7: satisfiability graph generation, maximal clique partitioning, and test generation using ATPG-based maximal clique activation, which are described below.

Algorithm 5 testGeneration with MC-ATPG

```
Input instrumentedDesign D, faultList Sf
Output testVectors T
    G ← getSATisfiabilityGraph(D, Sf)
    cliques ← maxCliquePartition(g)
    sort(cliques)
    for c in cliques do
      T ← T∪activateClique(D, c)
    end for
    Return T
```

Figure 8:
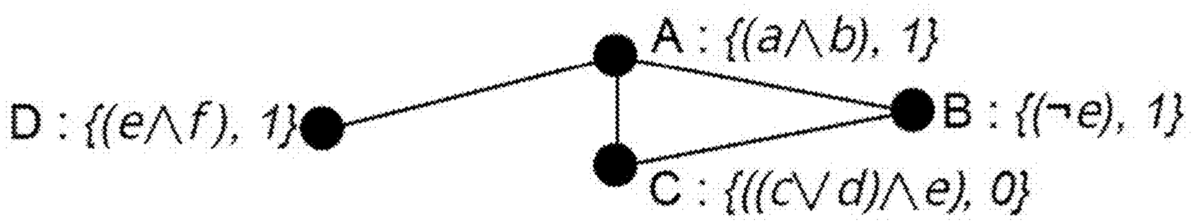
FIG. 8 shows a satisfiability graph with four nodes of the circuit in FIG. 1 (with logic expressions and rare values in parentheses).

The construction of the satisfiability graph utilizes the output from the rareness analysis as well as the instrumented design from the fault modeling. Each rare event (node) is a vertex of the satisfiability graph. An edge between those two rare nodes in the satisfiability graph implies that the respective logical expressions can be satisfied. For example, FIG. 8 shows the satisfiability graph constructed from the circuit in FIG. 1. In the extreme case (all the rare nodes are satisfiable), we will have a complete graph with $$n \times \frac{n-1}{2}$$

edges, where n is the number of nodes in the graph. For example, FIG. 8 has an edge between A and B since the logic expressions associated with them can be satisfied by feeding the input pattern '110100' to the circuit in FIG. 1. There is no edge between B and D because the input e has conflicting requirements (D expects it to be '1' while B expects it to be '0') which cannot be satisfied simultaneously.

Figure 9:
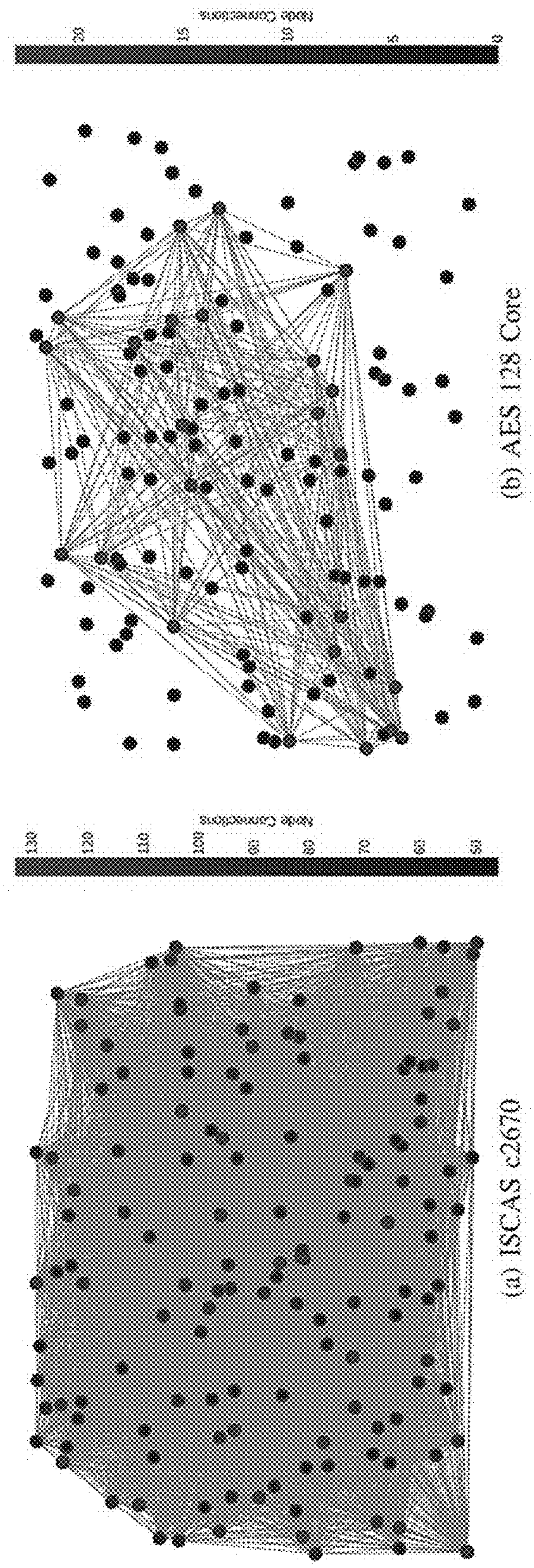
FIG. 9 shows a satisfiability graph constructed for ISCAS2670 in part (a) of the figure and AES 128 Core in part (b) of the figure using an exemplary method of the present disclosure.

FIG. 9 shows a satisfiability graph constructed for ISCAS2670 and AES 128 Core using the disclosed method. In order to keep the number of vertices the same for fair comparison, the rarest 130 nodes are selected from both designs. It can be observed that ISCAS (IEEE International Symposium on Circuits and Systems) benchmarks produce almost complete graphs while real-world IPs, such as AES, produce spares graphs. The lazy construction technique used by TARMAC works well with ISCAS benchmarks. However, in case of real-world designs, TARMAC's performance is negatively impacted during maximal clique activation.

Due to the internal structure of the circuit, the nature of the graph can vary. For example, in case of ISCAS2670 benchmark, the satisfiability graph is dense (FIG. 9, part (a)) since the rare signals closely related and well connected. On the other hand, the rare events are scattered across the AES 128 benchmark that leads to a sparse graph, as shown in FIG. 9, part (b). If the rare signals are located together as a single cluster, the output is a dense graph. Usually in large designs, we can find dense clusters scattered in the graph. For improved accuracy it is important to construct the satisfiability graph by querying all possible two trigger combinations $$(n \times \frac{n-1}{2}$$

of queries).

In order to reduce the overall time in handling exponential number of queries, the design is read with the ATPG tool of the present disclosure and specific pre-processing steps are stored. Later all the queries go through this model file and redundant pre-processing steps are eliminated during the queries. During each step, the model file is updated such that the calculations that were done for the earlier queries can be used for later queries.

All satisfiability queries are modeled as a combination of "atpg constraints" and "stuck-at faults." Algorithm 6 (below) presents the steps involved in constructing the satisfiability graph. First, all the rare events are processed, selecting one at a time. Then, the ATPG script is prepared by implementing the selected rare event as an output constraint. Next, all the remaining rare events are implemented as stuck-at faults and are fed to the ATPG tool. Since the instrumented design with all the rare events is connected to the output, we have the observability of all the rare events. Therefore, the rare events are observed in the output to identify the activated faults. Listing 4 (below) shows an example query for constructing the satisfiability graph of the example design provided in Listing 1. A timeout interval is implemented to prevent graph creation from getting stuck in one query. Depending on the processing capability of the system that hosts the ATPG tool, the timeout would be different.

An exemplary method only takes n queries to construct the graph when there are n nodes, while TARMAC makes $$n \times \frac{n-1}{2}$$

independent queries to construct the satisfiability graph. Although the ATPG tool calculates the connectivity between all the nodes, the extra overhead of each query can be reduced significantly with the exemplary method. FIG. 4 presents a comparison of the graph generation time for TARMAC including lazy construction with an exemplary MC-ATPG. It can be observed that the disclosed method drastically reduces the graph construction time.

Algorithm 6 getSATisfiabilityGraph( )

```
Input InstrumentedDesign D, rareEvents R_e
Output graph g
 1:  for Each r_i ∈ R_e do
 2:    tcl ← ∅
 3:    tcl.add(r_i as a po_contraint)
 4:    tcl.add(∀(R_e − r_i) as stuck-at_faults)
 5:    for po ∈ OutputVector(ATPG(D, tcl)) do
 6:      if po ∈ R_e and po == 1 then
 7:        e ← edge(r_i, po)
 8:        g.add(e)
 9:      end if
10     end for
11:  end for
12:  Return g
```

Listing 4: Sample satisfyaliblity query

```
1 read_image simpleAES.model
2 add_atpg_constraints a 1 -module simpleAES t0
3 add_faults -stuck 1 N13
4 set_atpg -full_seq_time {120 360}
5 run_atpg
```

Finding and listing all the cliques is an NP-complete problem. While there are promising algorithms, such as the Bron Kerbosch algorithm, the time complexity is in the order of $O(3^{n/3})$. Therefore a more quick approximation method is preferable to reduce the time taken for clique partitioning. The algorithm proposed by Eppstein et al. is used with the worst-case time in the order of $O(dn3^{d/3})$, where d is the smallest number such that every sub-graph of the original graph contains a vertex of at most degree of d. See Eppstein et al., "Listing All Maximal Cliques in Sparse Graphs in Near-Optimal Time" (2010). An example maximal clique that we can identify from the satisfiability graph in FIG. 8 is the sub-graph consisting of three nodes A, B, and C. Once all the maximal cliques are identified, they are sorted by the clique size and processed to generate test vectors to activate each of them.

All the maximal cliques that were identified are queried from the ATPG tool. Algorithm 7 (below) presents the steps involved in the final clique activation step. Here, all the vertices in the clique are listed as stuck-at-faults and po_constraints and make the ATPG query. The ATPG tool will provide a test vector for each maximal clique. For example, the ATPG tool will generate the test vector '110100' (or '111000') to activate the maximal clique (ABC) in FIG. 8.

Algorithm 7 activateClique( )

```
Input InstrumentedDesign D, clique c
Output testVectors T
1:  for Each v ∈ c do
2:    tcl ← ∅
3:    tcl.add(v as a po_contraint)
4:    tcl.add(v as a stuck-at_fault
5:    T ← T∪ATPG(D,tcl)
6:  end for
7:  Return T
```

In accordance with various embodiments, the generated test vectors are evaluated for their effectiveness in detecting hardware Trojans. Algorithm 8 (below) shows the three major steps in an exemplary coverage analysis. First, the Trojan-infected benchmarks are constructed in two ways. (1) The automated Trojan insertion framework developed by Cruz et al. is used that embeds a wide variety of Trojan configurations based on user constraints such as the type of Trojan, Trojan activation probability, number of triggers, and choice of payload. See Cruz et al., "An Automated Configurable Trojan Insertion Framework for Dynamic Trust Benchmarks," in Design Automation & Test in Europe (DATE) (2018), pp. 1598-1603. The tool also ensures that the inserted Trojan is valid. (2) Trojan inserted AES benchmarks from Trust-Hub are also used. Note that the Trojan insertion framework is independent of the test generation framework to ensure fair evaluation of the test generation techniques. Next, both golden and Trojan inserted benchmarks are simulated using the generated test patterns. Any mismatch in the outputs indicates a successful Trojan detection. Finally, the effectiveness of the generated tests are calculated as a percentage of the number of detected Trojans (activated triggers) over the total number of Trojans (valid triggers) in the benchmark suite.

Algorithm 8 Coverage Analysis

```
Input Design D, Tests
Output coverage M %
1:  {D_TR,N_TR} ← insertTrojans(D) + other sources
2:  for each t_i ∈ Tests do
3:    X ← simulate(D,t_i)
4:    Y ← simulate(D_TR,t_i)
5:    if X ≠ Y then
6:      activated++ ▷ activated was initialized to 0
7:    end if
8:  end for
9:  Return (activated/N_TR) × 100
```

Figure 10A:
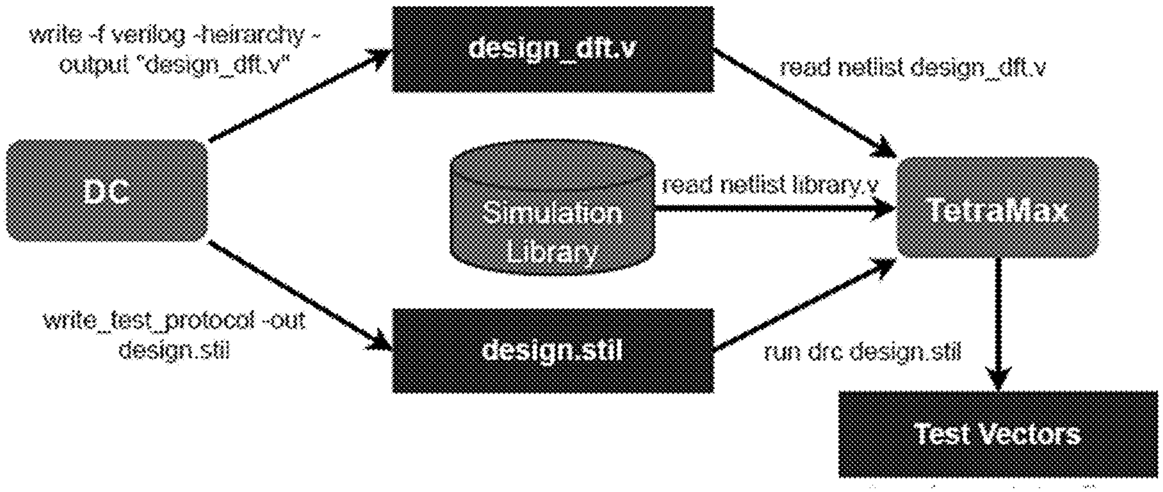
FIG. 10A shows an overview of an exemplary process involved in synthesizing with Synopsys Design Compiler (DC) and test pattern generation with Synopsys TetraMax.

To demonstrate the effectiveness of an exemplary test generation framework, scripts are developed to automate the entire process and Yosys synthesis tool is used to flatten the hierarchical designs before rareness analysis. For rareness and coverage analysis simulations, a Synopsys VCS simulator is used. For compiling the RTL designs to the gate-level netlist, a Synopsys DC Compiler is used. A Synopsys Tetramax is used as the ATPG tool. FIG. 10A illustrates the steps involved in synthesizing and test generation with DC Compiler and TetraMax. For maximal clique partitioning in near-optimal time, iGraph graph library is used. For validating the sampled Trojan triggers, the Enhanced Bound Model Checker (EBMC) is used. All the experiments including the execution of state-of-the-art test generation methods are carried out in a server environment with Intel® Xeon® CPU E5-2640 v3 @ 2.60 GHz processor and 64 GiB Memory. To provide an advantage to the state-of-the-art methods, designs are utilized without a scan chain.

Since most of the state-of-the-art test generation platforms have shown their effectiveness on ISCAS benchmarks, ISCAS benchmarks are used to show the effectiveness of the disclosed approach. Advanced Encryption Standard (AES), Elliptic Curve Digital Signature Algorithm (ECDSA) cryptographic designs, and several processor cores developed for RISC-V instruction set architecture were also used to show the scalability of the disclosed approach. Trojan-inserted benchmarks are collected following the procedure outlined in Algorithm 8 in order to compare the following five approaches: ND-ATPG: an exemplary approach for ATPG-based N-activation of rare events; MC-ATPG: an exemplary approach for ATPG-based maximal clique activation, see Chakraborty et al., "MERO: A Statistical Approach for Hardware Trojan Detection," in Cryptographic Hardware and Embedded Systems (CHES) (2009), pp. 396-410; MERO: state-of-the-art statistical test generation based Trojan detection; TARMAC: state-of-the-art maximal clique sampling based Trojan detection, see Lyu et al., "Scalable Activation of Rare Triggers in Hardware Trojans by Repeated Maximal Clique Sampling," IEEE Transactions on Computer-Aided Design of Integrated Circuits and Systems, vol. 40, no. 7 (2021), pp. 1287-1300); TGRL: state-of-the-art statistical test generation using reinforcement learning. See Pan et al, "Automated Test Generation for Hardware Trojan Detection Using Reinforcement Learning," in 2021 26th Asia and South Pacific Design Automation Conference (ASP-DAC) (2021), pp. 408-413.

The original versions of MERO, TARMAC, and TGRL did not support RTL models since they were designed specifically focusing on ISCAS netlist format. For the scalability evaluation, their netlist parsers have been modified to process Verilog designs. The implementation of TGRL is based on reinforcement learning that computes SCOAP parameters using SAT solvers. The implementation (designed for ISCAS netlist format) could not be modified to support Verilog RTL models. As a result, we are not able to compare scalability with TGRL. Since TGRL is based on MERO, which has fundamental scalability limitations (as discussed next), it is believed TGRL will also inherit the same scalability concerns.

It is observed that most of the RISC-V processor designs and cryptographic designs contain a considerable amount of fixed value signals. The rare signals were calculated after 10,000 random simulation iterations for the respective pipeline depth of the design and filtered with the rareness threshold of 0.01. Table II (below) shows the reduction of false rare signals based on static analysis. The first column indicates the design under consideration. The second and third columns show the number of total and rare signals, respectively. The fourth column shows the number of false rare signals. The fifth column shows the number of true rare signals after removing the false rare signals, and the last column shows the percentage reduction due to the removal of the false rare signals. The table illustrates that structural analysis removes a considerable percentage (up to 26%) of false positive rare signals. This can significantly reduce the test generation time since it has to deal with less number of signals. Moreover, the reduction of false rare signals reduces the chances of constructing invalid Trojan triggers during the evaluation of Trojan coverage.

TABLE II

| | Signals in Flattened Net-List | | | | |
|---|---|---|---|---|---|
| Design | Total Nets | Rare | False Rare | True Rare | Reduction |
| RV-UE | 497843 | 24545 | 5064 | 19481 | 20.6% |
| RISCY | 352968 | 13496 | 3609 | 9887 | 26.7% |
| ECC | 107925 | 492 | 107 | 385 | 21.7% |
| AES | 90956 | 371 | 70 | 301 | 18.8% |
| RSA | 1807 | 74 | 4 | 70 | 5.4% |

Table III (FIG. 10B) shows the results for combinational and sequential ISCAS benchmarks (Rareness threshold: 0.2, Number of rare signals in a Trigger varies between 1 to 6, Sample set size: 1000, N: 1000). For all the methods, the rareness threshold was selected as 0.2. For fair evaluation, during coverage analysis, the same set of sampled and validated triggers was considered on all the methods. Clearly, MC-ATPG and ND-ATPG significantly outperform MERO and TARMAC, and provide comparable/better results than TGRL. Note that the existing approaches (including TGRL which is built on top MERO) are not scalable as demonstrated in the next section.

Figure 11:
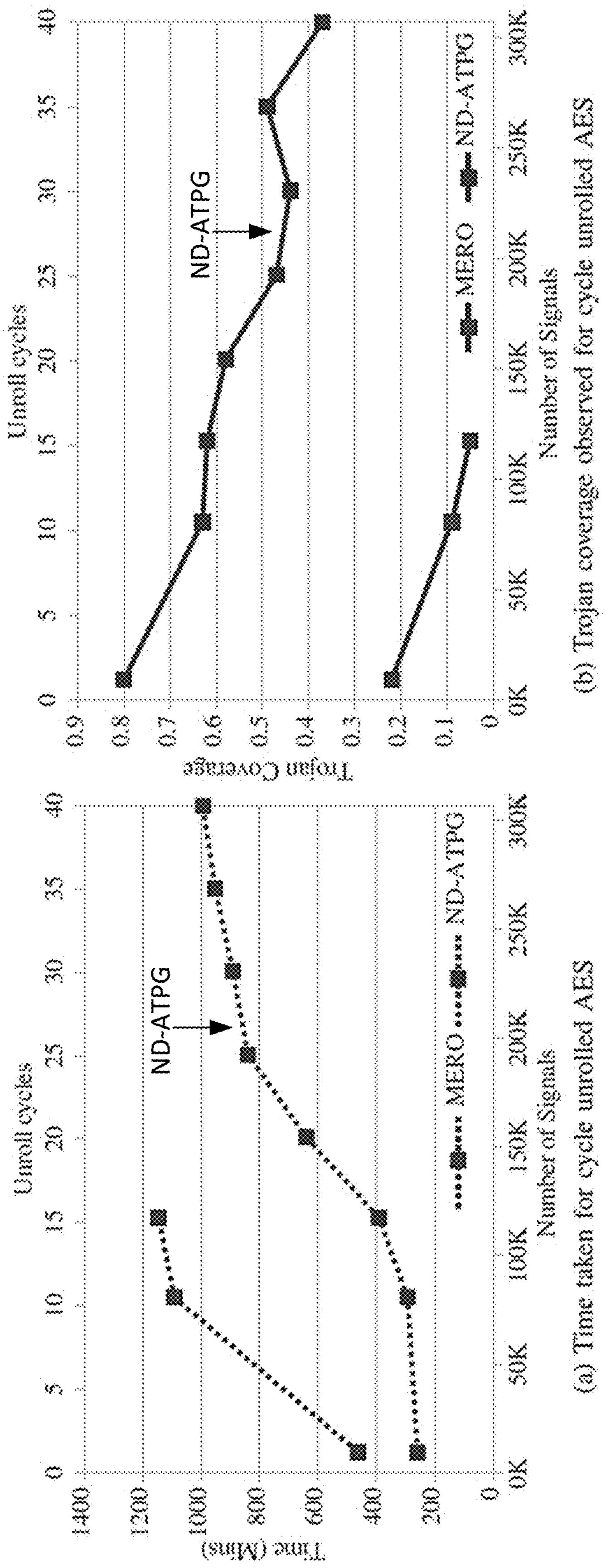
FIG. 11 are charts showing scalability of an exemplary ND-ATPG tool compared with MERO for cycle unrolled AES designs for (a) test generation time and (b) hardware Trojan coverage.
Figure 12:
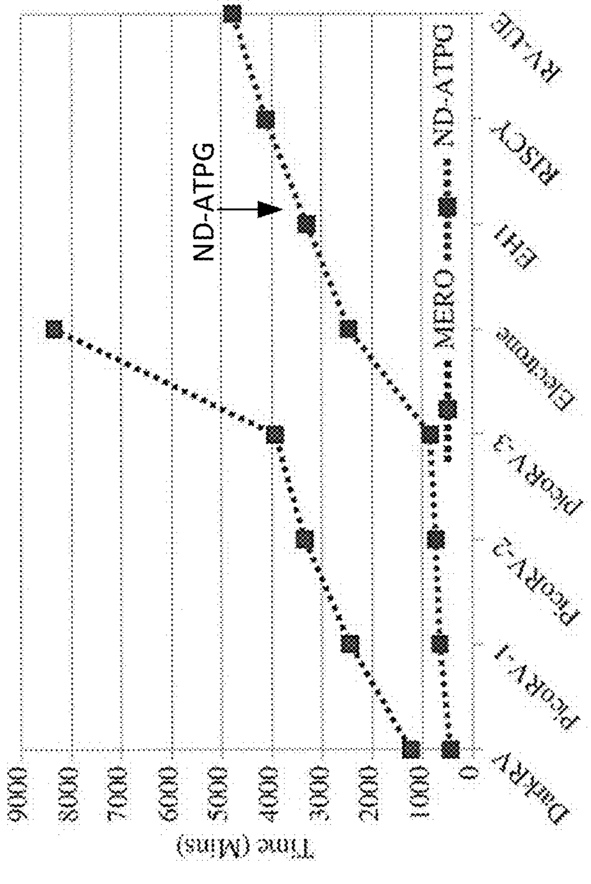
FIG. 12 are charts showing scalability of an exemplary ND-ATPG tool compared with MERO for different RISC-V processor cores for (a) eight RISC-V designs with increasing complexity, (b) test generation time, and (c) Trojan coverage.
Figure 12:
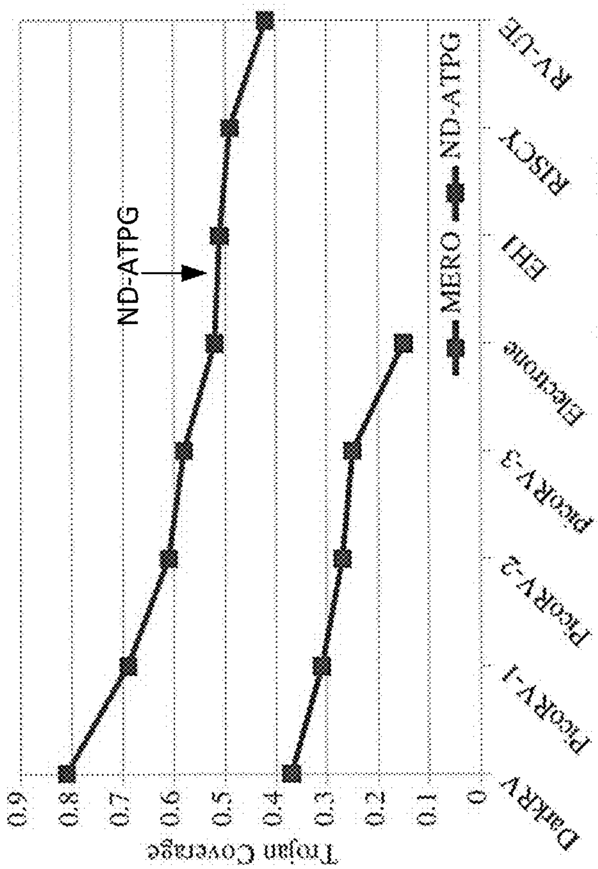

In order to demonstrate the scalability of ND-ATPG, two experiments have been created. In the first experiment, the cryptographic AES core is used. The AES design is unrolled for various numbers of cycles such that it increases the number of signals in the design. FIG. 11, part (a) illustrates the time taken to generate test vectors with ND-ATPG compared with MERO while FIG. 11, part (b) illustrates the Trojan coverage of ND-ATPG compared with MERO on cycle unrolled AES benchmarks. In the second experiment, RISC-V processor cores implemented in Verilog were used with the design complexity (number of signals in the flattened netlist) ranging from about 3K to 500K signals, as shown in FIG. 12, part (a). FIG. 12, part (b) and FIG. 12, part (c) present the comparison between ND-ATPG versus MERO for test generation time and observed Trojan coverage, respectively. The results of both experiments reveal that the disclosed method is scalable on large designs.

ND-ATPG is not compared with TARMAC, since TARMAC failed to run even on the smallest AES design (AES unrolled for 1 cycle). This is due to the fact TARMAC algorithm struggles at the logical expression generation stage as well as the SAT-solving stage due to the large number of signals in the design. MERO on the other hand has a feedback loop, where it does a bit flip and monitors for the rare signal activation. When the number of rare signals are high, this monitoring process gets tedious and eventually MERO fails. It can be seen in FIG. 11 and FIG. 12 that MERO fails when the number of signals in the design reaches more than 100K during both experiments. The disclosed method performs well on complex designs while maintaining high Trojan coverage.

Figure 13:
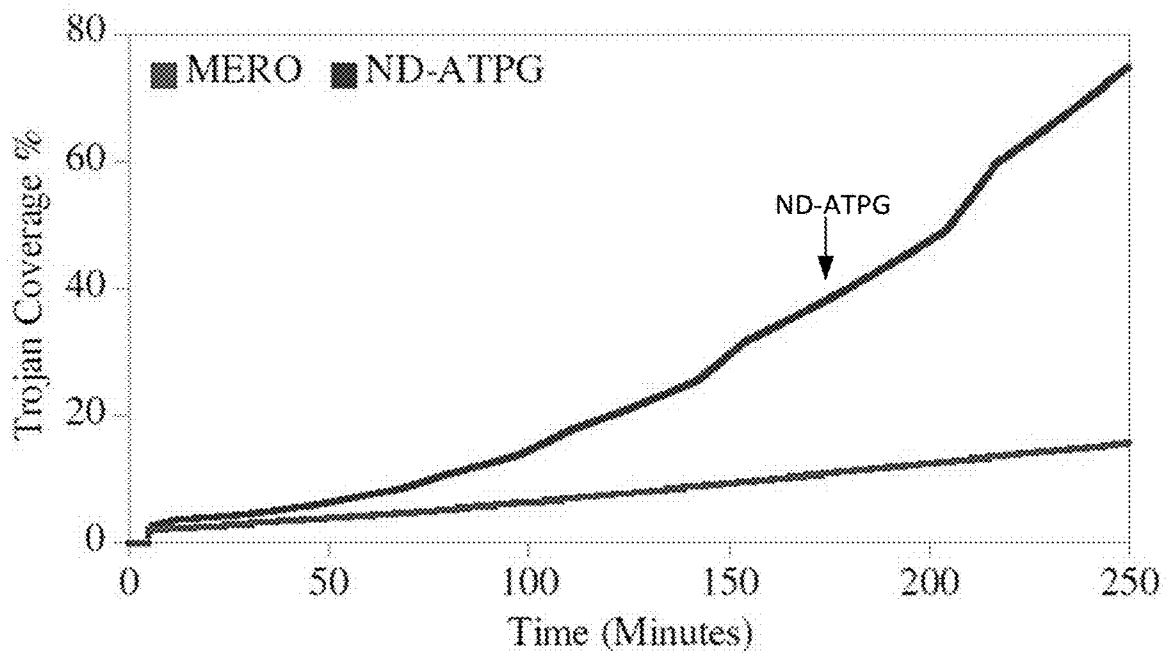
FIG. 13 is a chart showing Trojan coverage of MERO versus an exemplary ND-ATPG tool on the tests generated over same duration for AES Benchmark (for Trojans with trigger size 1/2/3/4).

In order to compare the efficiency of MERO and ND-ATPG on the AES benchmark, the Trojan coverage was analyzed with two methods once each method produces a test vector. FIG. 13 demonstrates that due to the forced activation of each rare signal by ND-ATPG, coverage increases within a small time duration. However, the Trojan coverage given by MERO remains inferior.

Table IV (FIG. 10C) shows the coverage results for the benchmarks of AES, ECDSA, and two RISC-V processor cores. For coverage calculations, varying trigger sizes are used from 1-10. When the design complexity is high, TARMAC gets stuck at the logical expression generation stage and fails the instrumentation stage. As expected, TARMAC failed to create satisfiability queries for complex designs of AES, ECDSA, RISCY, and RISCV-UE. Therefore, to make a fair comparison, sub-modules are included corresponding to each benchmark. The designs were flattened selecting sub-modules as a top module and obtained results for Sbox, SboxX, eeageneric, MontgomerryLadder, Execute, Decode, Issue, and LSU of the corresponding benchmarks. For all the experiments being discussed here, the rarest 130 signals are selected from the selected design. Due to the lazy construction of the satisfiability graph in TARMAC, there are an exponential number of false cliques in the satisfiability graph. To address the exponential problem, TARMAC employs random sampling of cliques. As a result, it misses the legitimate maximal cliques, which can significantly affect the Trojan coverage. However, MC-ATPG constructs the complete satisfiability graph with ATPG queries, and therefore, MC-ATPG does not generate any false cliques. Since the disclosed approach can be computed in parallel, the test generation time can be drastically reduced by performing parallel computation of ATPG queries. Moreover, the Trojan coverage can be improved by increasing the ATPG query time limit.

In order to demonstrate the effectiveness of the disclosed approach on rare branches, a separate experiment was designed. Table V (below) shows the results generated from Trojan inserted AES benchmarks from Trust-Hub. These AES benchmarks are specifically designed for side-channel analysis and triggers are embedded in rare branches. Results are generated on both scan-chain and non-scan versions of the same benchmark and compared them with MERO. ND-ATPG outperforms MERO due to the fact that ND-ATPG forcefully activates the rare branches while MERO relies on bit flipping of the initial random vectors. Also, when considering ND-ATPG, scan-chain versions can reach 100% branch coverage quickly. This also validates the fact that statistical test generation (e.g., MERO) designed for activating rare signals are not suitable for activating rare branches.

TABLE V

| | | | ND-ATPG | | | |
|---|---|---|---|---|---|---|
| | MERO [2] | | Non-scan | | With Scan | |
| Design | Branch Cov % | Time (S) | Branch Cov % | Time (S) | Branch Cov % | Time (S) |
| AES_T300 | 0% | 54000 | 75% | 50401 | 100% | 8.2 |
| AES_T400 | 0% | 54000 | 40% | 46400 | 100% | 7.1 |
| AES_T500 | 0% | 54000 | 28% | 16980 | 100% | 8.2 |
| AES_T600 | 8% | 54000 | 41% | 59801 | 100% | 11 |
| AES_T700 | 0% | 54000 | 27% | 27200 | 100% | 8.3 |
| AES_T800 | 0% | 54000 | 44% | 38405 | 100% | 1.9 |
| AES_T900 | 33% | 54000 | 100% | 15435 | 100% | 3.2 |
| AES_T1000 | 0% | 54000 | 34% | 46601 | 100% | 6.7 |
| AES_T1100 | 0% | 54000 | 20% | 47109 | 100% | 5.2 |
| AES_T1200 | 0% | 54000 | 33% | 59026 | 100% | 1.8 |

N-activation of ND-ATPG and N-Detection of MERO are similar in concept but there is a considerable difference in the performance. In order to demonstrate this, an ECDSA module was selected and the activation of rare events was observed. FIG. 3 shows the results of this experiment. MERO was unable to activate most of the rare signals even once, while less rare signals got activated more than N times (leading to inferior Trojan coverage). However, ND-ATPG (N-activation) has forced to activate almost all the rare events almost N times evenly which leads to superior Trojan coverage.

Next, the applicability and limitations of the disclosed test generation algorithms are considered by evaluating four aspects: (1) practical considerations during rareness threshold selection, (2) detection of diverse Trojan types, (3) the requirement of controllability for the effectiveness of the proposed techniques, and (4) applicability beyond hardware Trojan detection.

As discussed, an exemplary test generation approach involves two parts: (i) rareness analysis to produce a set of rare (target) signals and (ii) test generation to maximize the likelihood of detecting a Trojan constructed using the target signals. The rareness threshold should be chosen such that the selected rare signals cannot be activated by traditional simulation using millions of random tests. These are the signals that an attacker is likely to use to construct a trigger that can stay hidden during traditional validation. There are several practical considerations since there can be thousands of rare signals in a typical million-gate design that cannot be activated during traditional validation. If the rareness threshold is set too low, the number of rare signals in the set will be less, and the test generation algorithm will finish faster. However, the attacker may use other rare signals (outside the set). If the rareness threshold is set too high, the test generation will take more time but more scenarios where an attacker can mount a Trojan can be covered.

There can be scenarios when the rareness threshold may be partially or completely irrelevant. For example, a designer may bypass rareness analysis and provide a list of suspicious signals as input for test generation. Similarly, a designer may choose a low rareness threshold to select very rare signals and manually add other signals based on specific objectives (e.g., XOR-LFSR related signals).

The applicability of the disclosed approach was evaluated on diverse benchmarks in ISCAS and Trust-Hub. Each of these Trojans relies on the assumption that an attacker is likely to construct a trigger using rare events. In other words, the first step of our framework performs rareness analysis to construct a set of target (rare) events, which is used as an input by the disclosed test generation algorithms (ND-ATPG and MC-ATPG) to maximize the likelihood of detecting a Trojan constructed using the target events. Exemplary test generation algorithms of the present disclosure are also applicable when the above assumption is not true. For example, consider a XORLFSR Trojan that is constructed from Linear Feedback Shift Registers (LFSR). To detect XOR-LFSR Trojans, the signals from the LFSR need to be selected as target signals (instead of rare signals or in addition to rare signals). Note that the exemplary test generation algorithms do not require any changes. LFSR can be implemented in two ways-using an initial seed value based function or an internal fixed value based function (not likely to be used by an attacker due to the predictability of the LFSR output). In case of initial seed value-based functions, the disclosed approach is effective since it is utilizing statistical guarantees of activating each register bit N times, and therefore, it increases the likelihood of activating the Trojan trigger irrespective of which bits are selected by the adversary to construct the XOR gate. If the inputs cannot control the LFSR, the disclosed approach performs comparable to random tests since there is no controllability over the LFSR register.

Figure 14:
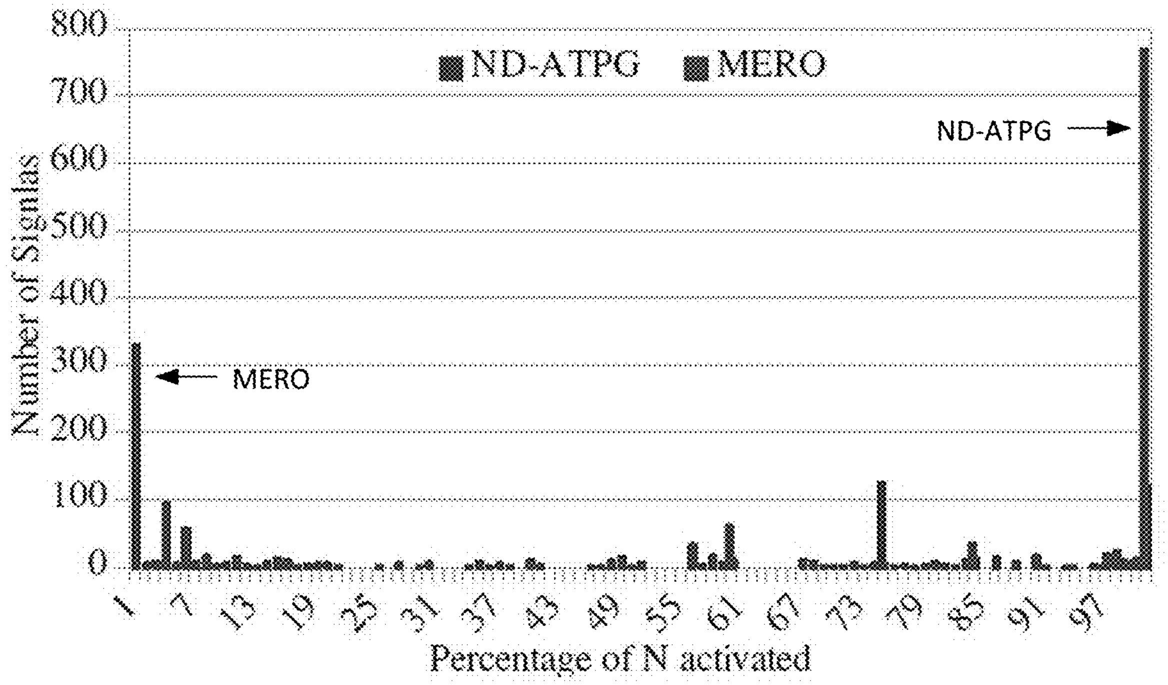
FIG. 14 is a chart showing a number of signals that are activated N=100 times for MERO versus an exemplary ND-ATPG tool.

Test generation based techniques rely on the controllability of the internal signals to generate effective test cases. In the case of ND-ATPG, the reachability of N activation for every signal is determined by the controllability of signals in the design. If a design does not have good controllability, there will be more signals that do not have N possible tests (even if we try all possible input combinations). FIG. 14 shows how many times a signal got activated by ND-ATPG and MERO for 1000 rare signals in ECC Coordinate conversion module in ECDSA benchmark with N as 100. As the experimental results demonstrate, a vast majority of the signals are able to be activated N times. In fact, the remaining ones got activated very close to N times. For example, the tallest bar on the right side of the figure indicates that about 780 signals got activated 100 times by ND-ATPG. In contrast, only a small percentage of signals get activated N times by state-of-the-art (MERO). For example, the tallest bar on the left side of the figure indicates that about 340 signals (out of 1000) were not activated at all by MERO. Note that the summation of the heights of all the bars in the same color should be 1000 (total number of rare signals).

Although a focus of the present disclosure is hardware Trojan detection, the disclosed algorithms can be utilized for security validation, functional validation, manufacturing testing, as well as reliability validation. Specifically, an exemplary ATPG-based scalable test generation algorithms are effective in activating a specific node N times (ND-ATPG) or activating M nodes at the same time (MC-ATPG). Therefore, ND-ATPG can be utilized to improve functional coverage by activating corner cases and hard-to-activate functional behaviors. Similarly, ND-ATPG can improve trust coverage by activating hard-to-detect security vulnerabilities. Likewise, MC-ATPG can be adopted in manufacturing testing to generate efficient test vectors to activate multiple stuck-at-faults.

Depending on the scale of the design under test and the verification requirement, the disclosed technology can be deployed in environments with different computation capability levels, such as small benchmarks (designs) and large industrial designs. When dealing with small benchmarks (thousands of gates), the disclosed technology can be executed on regular computers. Iterative refinements can be added to the designs until the design reaches the expected security level (malicious implants coverage). For example, an alternate implementation of a specific module can be used to reduce the number of rare signals.

An industrial design, such as an SoC, can have hundreds of modules totaling millions of gates. The disclosed technology can take hours to days to provide reasonable coverage using traditional computing environment. Given the hard time constraint in ASIC design flow, it is preferable to validate the design for potential Trojan implantation capability within a small percentage of total validation time. Therefore, the industrial solution for generating test cases for security validation of real-world implementations is to use any high-performance computing environment. For example, in a multicore environment, the performance of the disclosed technology may be significantly improved by utilizing different forms of parallelism, such as computation parallelism and structural parallelism. Accordingly, exemplary test generation systems and methods of the present disclosure utilize ATPG queries to generate test vectors. Since all the queries are independent to each other, they can be processed by different CPU cores in the system to accelerate the process. Additionally, each design, such as SoC, consists of a large number of modules. The disclosed method can be applied on different modules running on different cores, and the final (global) test patterns can be obtained by combining the module-level (local) tests.

In brief, hardware Trojan detection is a major challenge due to the difficulty in activating rare triggers. While there are many promising test generation approaches for Trojan detection, they are not scalable for large designs. Moreover, their applicability is limited to detecting specific types of Trojans. The present disclosure presents an ATPG-based scalable framework for activation of rare events consisting of both rare signals and rare branches. The present disclosure shows that both rare signals and rare branches can be mapped to stuck-at faults. As a result, ATPG can be used to generate test patterns to activate rare events. The present disclosure presents an automated constraint generation method to perform N-activation of rare events as well as maximal clique coverage of rare events using ATPG. Experimental results demonstrate that the disclosed approach significantly outperforms the state-of-the-art test generation methods. It highlights the fact that existing statistical approaches are not effective in satisfying the N-detect principle and therefore provide inferior Trojan coverage compared to the disclosed approach. It also reveals that the existing test generation techniques or activating rare signals are not suitable for activating rare branches, highlighting the need for the disclosed approach.

Figure 15:
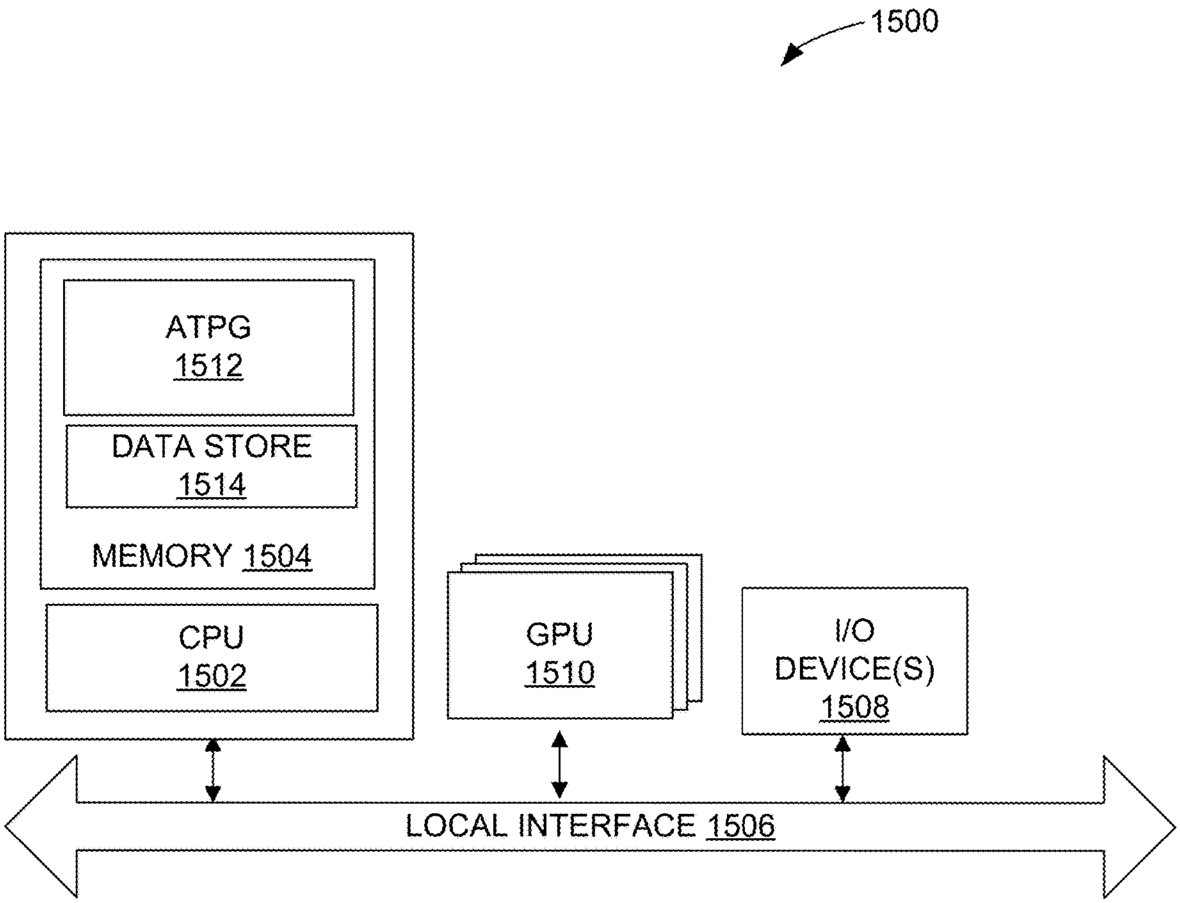
FIG. 15 depicts a schematic block diagram of a computing device that can be used to implement various embodiments of the present disclosure.

FIG. 15 depicts a schematic block diagram of a computing device 1500 that can be used to implement various embodiments of the present disclosure. An exemplary computing device 1500 includes at least one processor circuit, for example, having a processor (CPU) 1502 and a memory 1504, both of which are coupled to a local interface 1506, and one or more input and output (I/O) devices 1508. The local interface 1106 may comprise, for example, a data bus with an accompanying address/control bus or other bus structure as can be appreciated. The computing device 1100 may further include Graphical Processing Unit(s) (GPU) 1110 that are coupled to the local interface 1506 and may utilize memory 1504 and/or may have its own dedicated memory. The CPU and/or GPU(s) can perform any of the various operations described herein.

Stored in the memory 1504 are both data and several components that are executable by the processor 1502. In particular, stored in the memory 1504 and executable by the processor 1502 are code (1512) for implementing Automated Test Pattern Generation (ATPG) based activation of rare events in accordance with teachings of the present disclosure. Also stored in the memory 1504 may be a data store 1514 and other data. The data store 1514 may store data related to the computations performed by ATPG processes (e.g., ND-ATPG and MC-ATPG). In addition, an operating system may be stored in the memory 1504 and executable by the processor 1502. The I/O devices 1508 may include input devices, for example but not limited to, a keyboard, mouse, etc. Furthermore, the I/O devices 1508 may also include output devices, for example but not limited to, a printer, display, etc.

Embodiments of the present disclosure can be implemented in hardware, software, firmware, or a combination thereof. In an exemplary embodiment, exemplary ATPG logic or functionality is implemented in software or firmware that is stored in a memory and that is executed by a suitable instruction execution system. If implemented in hardware, as in an alternative embodiment, ATPG logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A method for test pattern generation to detect a hardware Trojan comprising:

- simulating, by a computing device, an integrated circuit design;
- during the simulation, identifying rare nodes within the integrated circuit design that are activated less than a predefined rareness threshold, wherein the rare nodes include both signals and branches of the integrated circuit design;
- mapping, by the computing device, each rare node to a stuck-at fault model;
- obtaining, by the computing device, a first set of N test vectors for each stuck-at fault model using Automated Test Pattern Generation, wherein each of the N test vectors activates a same rare node of the integrated circuit design, wherein the first set of N test vectors are obtained by:
  - for each stuck-at fault model, determining a pilot test vector to activate the stuck-at fault model; and
  - generating N−1 test vectors for each pilot test vector based on a constraint, wherein N−1 constraints are used to generate the N−1 test vectors, wherein each N−1 test vector activates a same stuck-at fault, thereby increasing a likelihood of activating the Hardware trojan;
- identifying, by the computing device, maximal cliques of rare nodes in the integrated circuit design that can be activated at a same time; and
- generating, by the computing device, a second set of test vectors to activate each of the identified maximal cliques using Automated Test pattern Generation.

2. The method of claim 1, further comprising applying, by the computing device, the first set and the second set of test vectors to an integrated circuit having the integrated circuit design in order to detect whether a hardware Trojan is embedded in the integrated circuit.

3. The method of claim 1, wherein the integrated circuit design is in the form of a gate level netlist.

4. The method of claim 1, wherein the integrated circuit design is in the form of a register-transfer level (RTL) design.

5. The method of claim 1, further comprising generating, by the computing device, a constraint from a previously generated test vector.

6. The method of claim 1, wherein the Automated Test Pattern Generation is utilized for scalable test generation as well as Trojan detection.

7. A system for test pattern generation to detect a hardware Trojan comprising:

- a processor of a computing device; and
- a tangible, non-transitory memory configured to communicate with the processor, the tangible, non-transitory memory having instructions stored thereon that, in response to execution by the processor, cause the computing device to at least:
  - simulate an integrated circuit design;
  - during the simulation, identify rare nodes within the integrated circuit design that are activated less than a predefined rareness threshold, wherein the rare nodes include both signals and branches of the integrated circuit design;
  - map each rare node to a stuck-at fault model;
  - obtain a first set of N test vectors for each stuck-at fault model using Automated Test Pattern Generation, wherein each of the N test vectors activates a same rare node of the integrated circuit design, wherein the first set of N test vectors are obtained by:
    - for each stuck-at fault model, determining a pilot test vector to activate the stuck-at fault model; and
    - generating N−1 test vectors for each pilot test vector based on a constraint, wherein N−1 constraints are used to generate the N−1 test vectors, wherein each N−1 test vector activates a same stuck-at fault, thereby increasing a likelihood of activating the Hardware trojan;
  - identify maximal cliques of rare nodes in the integrated circuit design that can be activated at a same time; and
  - generate a second set of test vectors to activate each of the identified maximal cliques using Automated Test pattern Generation.

8. The system of claim 7, wherein the computing device is further caused to apply the first set and the second set of test vectors to an integrated circuit having the integrated circuit design in order to detect whether a hardware Trojan is embedded in the integrated circuit.

9. The system of claim 7, wherein the integrated circuit design is in the form of a gate level netlist.

10. The system of claim 7, wherein the integrated circuit design is in the form of a register-transfer level (RTL) design.

11. The system of claim 7, wherein the computing device is further caused to further generate a constraint from a previously generated test vector.

12. The system of claim 7, wherein the Automated Test Pattern Generation is utilized for scalable test generation as well as Trojan detection.

13. A non-transitory computer-readable medium having instructions stored therein, wherein the instructions, when executed by a processor, cause the processor to:

simulate an integrated circuit design;

during the simulation, identify rare nodes within the integrated circuit design that are activated less than a predefined rareness threshold, wherein the rare nodes include both signals and branches of the integrated circuit design;

map each rare node to a stuck-at fault model;

obtain a first set of N test vectors for each stuck-at fault model using Automated Test Pattern Generation, wherein each of the N test vectors activates a same rare node of the integrated circuit design, wherein the first set of N test vectors are obtained by:

for each stuck-at fault model, determining a pilot test vector to activate the stuck-at fault model; and generating N−1 test vectors for each pilot test vector based on a constraint, wherein N−1 constraints are used to generate the N−1 test vectors, wherein each N−1 test vector activates a same stuck-at fault, thereby increasing a likelihood of activating a Hardware trojan;

identify maximal cliques of rare nodes in the integrated circuit design that can be activated at a same time; and generate a second set of test vectors to activate each of the identified maximal cliques using Automated Test pattern Generation.

14. The non-transitory computer-readable medium of claim 13, wherein the processor is further caused to apply the first set and the second set of test vectors to an integrated circuit having the integrated circuit design in order to detect whether a hardware Trojan is embedded in the integrated circuit.

15. The non-transitory computer-readable medium of claim 13, wherein the integrated circuit design is in the form of a gate level netlist.

16. The non-transitory computer-readable medium of claim 13, wherein the integrated circuit design is in the form of a register-transfer level (RTL) design.

17. The non-transitory computer-readable medium of claim 13, wherein the Automated Test Pattern Generation is utilized for scalable test generation as well as Trojan detection.

18. The non-transitory computer-readable medium of claim 13, wherein the processor is further caused to generate a constraint from a previously generated test vector.

* * * * *